(12) United States Patent
Fernandez (10) Patent No.: US 8,290,979 B1
(45) Date of Patent: *Oct. 16, 2012

(54) SOFTWARE ARCHITECTURE FOR ACCESS CONTROL BASED ON HIERARCHICAL CHARACTERISTICS

(75) Inventor: Richard Fernandez, Kailua, HI (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 1771 days.

This patent is subject to a terminal disclaimer.

(21) Appl. No.: 11/167,404

(22) Filed: Jun. 27, 2005

Related U.S. Application Data (63) Continuation-in-part of application No. 11/081,896, filed on Mar. 10, 2005, now abandoned, and a continuation-in-part of application No. 11/081,897, filed on Mar. 10, 2005.

(51) Int. Cl.
*G06F 7/00* (2006.01)
*G06F 17/30* (2006.01)

(52) U.S. Cl. .................................. 707/782; 707/783

(58) Field of Classification Search .................. 707/10, 707/9, 100, 781, 782, 783; 714/31; 370/463; 709/224
See application file for complete search history.

(56) References Cited

U.S. PATENT DOCUMENTS

| | | | | |
|---|---|---|---|---|
| 5,263,157 | A * | 11/1993 | Janis | 707/9 |
| 5,761,429 | A * | 6/1998 | Thompson | 709/224 |
| 6,542,515 | B1 * | 4/2003 | Kumar et al. | 370/463 |
| 2003/0074580 | A1 * | 4/2003 | Knouse et al. | 713/201 |
| 2004/0158584 | A1 * | 8/2004 | Necsoiu et al. | 707/104.1 |
| 2006/0106825 | A1 * | 5/2006 | Cozzi | 707/100 |

* cited by examiner

*Primary Examiner* — Christyann Pulliam
*Assistant Examiner* — Fariborz Khoshnoodi
(74) *Attorney, Agent, or Firm* — Ryan J. Friendl; Kyle Eppele (57) ABSTRACT

A Software Architecture for Access Control Based on Hierarchical Characteristics includes a computer implemented software architecture for determining object access of a resource by comparing an object profile to a resource profile. The comparison is made with reference to a plurality of object reference categories where each object reference category includes a plurality of hierarchically linked object reference values. The object reference values represent possible characteristics of the object such as, security clearance or job title. The resource profile represents the minimum object reference values necessary for access to the resource and the object profile represents no more than one object reference value for each of the object reference categories.

21 Claims, 12 Drawing Sheets

SOFTWARE ARCHITECTURE FOR ACCESS CONTROL BASED ON HIERARCHICAL CHARACTERISTICS

CROSS-REFERENCE TO RELATED APPLICATIONS

This application is a continuation-in-part of commonly assigned U.S. application Ser. No. 11/081,896, filed Mar. 10, 2005 now abandoned, entitled "Method of Access Control Based on Hierarchical Characteristics", and a continuation-in-part of commonly assigned U.S. application Ser. No. 11/081,897, filed Mar. 10, 2005, entitled "System of Access Control Based on Hierarchical Characteristics". These applications are hereby incorporated by reference.

FEDERALLY-SPONSORED RESEARCH AND DEVELOPMENT

The SOFTWARE ARCHITECTURE FOR ACCESS CONTROL BASED ON HIERARCHICAL CHARACTERISTICS is assigned to the United States Government and is available for licensing for commercial purposes. Licensing and technical inquiries should be directed to the Office of Patent Counsel, Space and Naval Warfare Systems Center, San Diego, Code 20012, San Diego, Calif., 92152; telephone (619)553-3001, facsimile (619)553-3821.

BACKGROUND OF THE INVENTION

The SOFTWARE ARCHITECTURE FOR ACCESS CONTROL BASED ON HIERARCHICAL CHARACTERISTICS generally relates to computer implemented access control, and more particularly, relates to a software architecture for controlling object access to a resource by utilizing multiple object characteristics.

Access to resources such as, software applications, web services, physical containers or even facilities are becoming increasingly difficult to manage via access control lists (ACLs) or group policies. An "Object" typically represents a person or thing seeking resource access. ACLs usually grant resource access by evaluating an object's name or unique identifier and comparing it to a pre-approved list. If an object such as, a user, is re-assigned, changes clearance or is promoted, access to resources should also change. Currently, ACL resource managers (RM) must evaluate personnel records to determine resource access. Such a task can become time-consuming and inefficient as the number of personnel and resources within an organization grow. Limited access to personnel records by RMs could compound the problem.

Another limitation with ACLs and Groups is their inability to accurately and quickly respond to the existence of constantly changing environmental statuses. Homeland Security and regional Information Assurance (IA) agencies are authorized to impose security levels (environmental condition) within their jurisdiction. Access to a wide range of resources by many objects should be affected at the precise time a security level (environmental status) changes. Sudden changes in security conditions may not allow sufficient time to modify an ACL or Group, thereby creating possible security breaches by un-authorized resource access. Finer granularity of resource access may be required during certain security conditions.

SUMMARY OF THE INVENTION

The Software Architecture for Access Control Based on Hierarchical Characteristics has the ability to receive an updated object profile and environmental status (referred as reference inputs) and compare these reference inputs with reference conditions to determine resource access. By way of example, an object's personnel records is queried and compiled into an object profile precisely at the time the object is evaluated by the system to determine resource access. In the event an object characteristic changed, such as job title or security clearance, access to resources may be affected. In one embodiment, environmental statuses such as environmental security level inputs are compared with preconfigured environmental reference conditions to determine resource access by an object.

In one aspect of the invention, a software architecture for controlling object access of a resource includes a rules engine service for determining object access of a resource by comparing an object profile to a resource profile based on a plurality of object reference categories, wherein: (i) each of the object reference category includes a plurality of hierarchically linked object reference values; (ii) the resource profile represents the minimum object reference values necessary for access to the resource; and (iii) the object profile represents no more than one object reference value for each of the object reference categories.

In another aspect of the invention, a software architecture for controlling object access of a resource includes a rules engine service for determining object access of a resource by comparing an environmental status to a resource profile based on a plurality of environmental reference categories, wherein: (i) each of the environmental reference categories include a plurality of hierarchically linked environmental reference values; (ii) the resource profile represents the minimum environmental reference values necessary for access to the resource; and (iii) the environmental status represents no more than one environmental reference value for each of the environmental reference categories.

In yet another aspect of the invention, a computer program product for use with a computer system includes a machine-readable recording medium and a first instruction means, recorded on the recording medium, for directing the computer system to provide a rules engine service for determining object access of a resource by comparing an object profile to a resource profile based on a plurality of object reference categories, wherein: (i) each object reference category includes a plurality of hierarchically linked object reference values; (ii) the resource profile represents the minimum object reference values necessary for access to the resource; and (iii) the object profile represents no more than one object reference value for each of the object reference categories.

DESCRIPTION OF SOME EMBODIMENTS

Following is a glossary of terms and abbreviations used to describe the Software Architecture for Access Control Based on Hierarchical Characteristics. The definitions set forth in the glossary are representative of the intended meanings as used herein.

GLOSSARY

The terms "access control role" and "ACR" correlate to a specific resource role to control the level of access to a resource. The ACR may be configured for conditional access by including one or more resource profiles, any of which has to match an object profile, environmental status, or complex, in order to be granted access to a particular resource role. The ACR may also be disabled to prevent particular access to a resource role and can also be configured for anonymous access to allow all object particular access to a resource role.

The term "complex operation" means an operation that processes certain reference inputs such as an object profile or environmental status and produces a Boolean or variable output. Complex operations can be customized by a resource manager.

The terms "complex reference category" and "RCcpx" mean a label that is used to distinguish the type of data represented by complex reference values.

The terms "complex reference value" and "rVcpx" mean data representing the result of a complex operation performed on an object profile and/or environmental status. By way of example, a complex reference value can represent a variable or a Boolean.

The term "computer" means any device capable of processing information to produce a desired result.

The term "environmental" means data representing non-object references that can dynamically change with time. Environmentals can consist of environmental reference categories and corresponding environmental reference values.

The term "environmental status" means data representing an environmental condition input from an external device or system. By way of example, an environmental status may be data representing time-of-day, date, security threat level, or weather.

The terms "environmental reference category" and "RCenv" mean a label that is used to distinguish the type of data represented by environmental reference values. By way of example, environmental reference categories may be "time-of-day", "date", "security threat level", or "weather."

The terms "environmental reference value" and "rVenv" mean data representing a possible environmental condition (reference condition) or environmental status (reference input). By way of example, an environmental reference value may be data representing time, date, security, or weather conditions.

The term "machine-readable recording medium" means a physical material in or on which data may be represented wherein the data can be read by an input unit for storage, processing, or display.

The term "memory" means a device where information can be stored and retrieved. Memory may refer to external storage such as disk drives or tape drives. Memory may also refer to semiconductor storage directly connected to a processor such as RAM, EEPROM, EPROM, flash memory, PROM, RAM, or ROM.

The term "object" means anything that requires access to a resource. An object can represent a user, software application, or another resource.

The term "object profile" means data representing a list of object reference values corresponding to the characteristics of an object. An object profile contains no more than one object reference value per object reference category. An object profile is classified as a reference input. Table 1 illustrates an example of an object profile, in accordance with the Software Architecture for Access Control Based on Hierarchical Characteristics.

TABLE 1

OBJECT PROFILE

| Reference Categories | Reference |
| --- | --- |
| Paygrade | ou = GS2, ou = GS1, ou = paygrade, o = Enterprise |
| Clearance | ou = secret, ou = confidential, ou = fouo, ou = Clearances, o = Enterprise |
| Command | ou = N661, ou = N66, ou = N6, ou = COMPACFLT, ou = Command, o = CPF |
| BilletTitle | ou = Developer, ou = BilletTitle, o = Enterprise |
| Branch | ou = Dod, ou = Branch, o = Enterprise |

The terms "object reference category" and "RCobj" are labels that are used to distinguish the type of data represented by object reference values. By way of example, object reference categories may be "security clearance", "paygrade", "job function", "employer", or "organizational group."

The terms "object reference value" and "rVobj" mean data representing an object characteristic. By way of example, an object reference value may be data representing an object's security clearance, paygrade, job function, employer, or organizational group.

The term "processor" means the computational and control unit of a computer; a device that interprets and executes instructions.

The abbreviation "RC" means reference category.

The abbreviation "RCL" means reference category list.

The abbreviation "RCH" means reference category hierarchy.

The abbreviation "rV" means reference value.

The abbreviation "rVT" means reference value sub-tree. The rVT includes a parent and all associated children.

The term "reference" means data used to describe objects, environmentals and complexes. References consist of reference categories (RC) and corresponding reference values (rV). References can also consist of a hierarchy or list structure, which can be evaluated for inheritance of permissions to allow or deny resource access. References can be represented in distinguished name (DN) format, typically used in Lightweight Directory Access Protocol (LDAP) version 3 directory services, Extended Markup Language (XML) tag library or in an object oriented language structure.

The term "reference condition" means the conditions that are selected by a resource manager to establish criteria to access a resource. Reference conditions may consist of objects, environmental and complex reference values. Reference conditions may include one or more reference value per reference category and may also include reference value sub-trees per reference category.

The term "reference inputs" refers to reference values from an object profile, environmental status, or complex output. Reference inputs include a single reference value per reference category.

The term "resource" means any asset that requires security validation such as electronic data, software applications, web services, or the contents of a physical drawer or safe.

The term "resource profile" means data representing the minimum reference values necessary to access the resource. The resource profile may include data representing the minimum object, environmental or complex reference value conditions necessary to access the resource. Table 2 illustrates an example of a resource profile, in accordance with the Software Architecture for Access Control Based on Hierarchical Characteristics.

TABLE 2

RESOURCE PROFILE

| Reference Categories | Reference |
|---|---|
| Paygrade | ou = GS2, ou = GS1, ou = paygrade, o = Enterprise |
| Clearance | ou = secret, ou = confidential, ou = fouo, ou = Clearances, o = Enterprise |
| Command | ou = N651, ou = N65, ou = N6, ou = COMPACFLT, ou = Command, o = CPF |

The term "resource role" means the privileges associated with a particular resource, such as: administrator, user, or guest.

Figure 1:
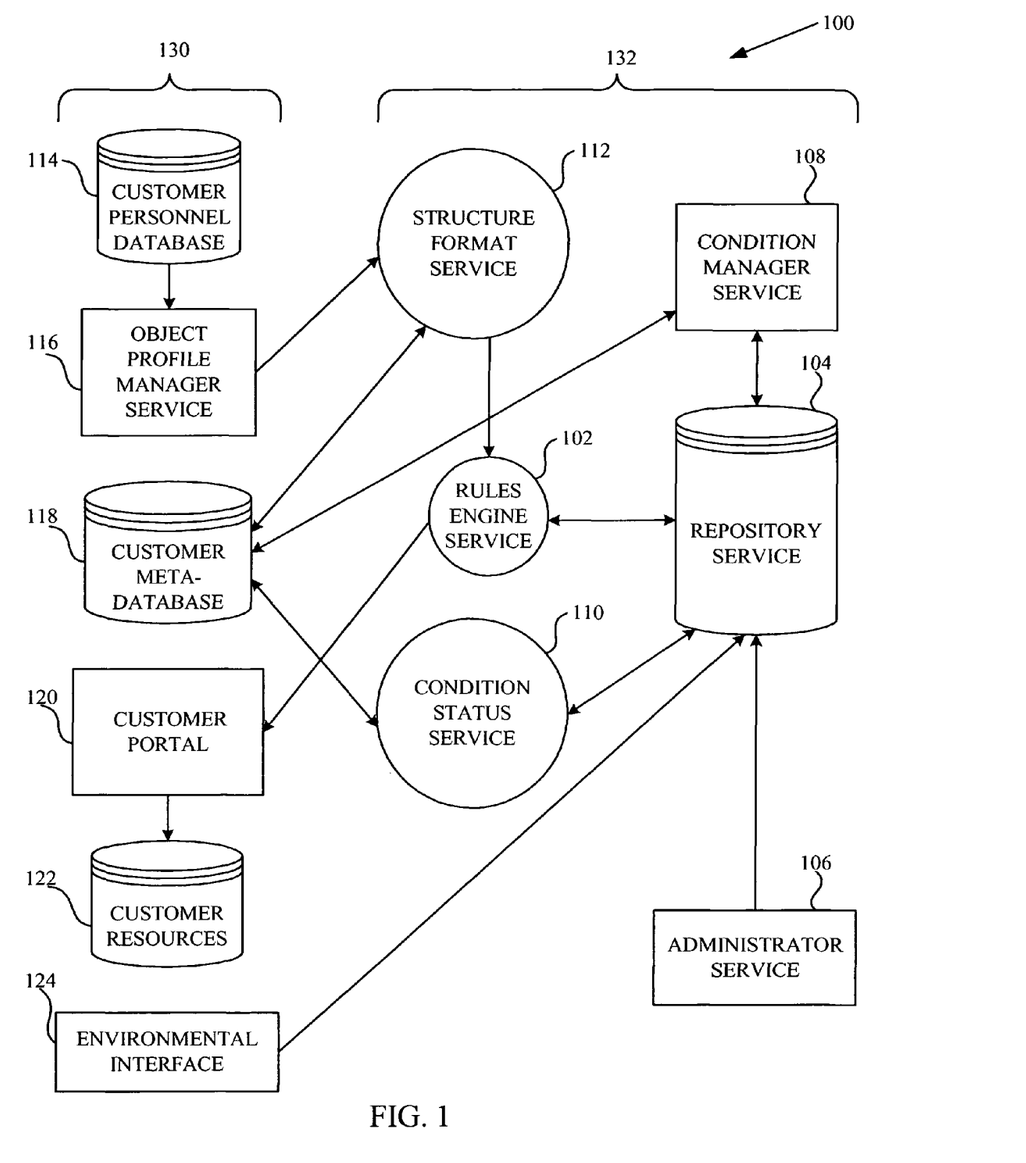
FIGS. 1-11 are block diagrams illustrating various aspects of the Software Architecture for Access Control Based on Hierarchical Characteristics.

FIG. 1 illustrates a system diagram 100, in accordance with the Software Architecture for Access Control Based on Hierarchical Characteristics. System diagram 100 includes customer provided assets 130 and software services 132. Customer provided assets include customer personnel database 114, object profile manager service 116, customer meta-database 118, customer portal 120, customer resources 122, and environmental interface 124. Customer personnel database 114 is a customer provided database that contains personnel data or characteristic values about employees, such as their pay grade, job description, organizational assignment, etc. The Object profile manger service 116 is for querying customer personnel database 114 in order to present objects with a list of object profiles.

Customer meta-database 118 is a customer provided data store that contains data (or references) used to establish conditions for resource access. The data contained in the customer meta-database represents corporate characteristics, such as pay, job description, organization structures, environmental states and complex outputs. Customer portal 120 is the interface with rules engine service 102 such that accessible resources and roles may be listed. Customer resources 122 may include resources, such as software applications, web services, cipher locks, etc. Environmental interface 124 is for furnishing software resources 132 with environmental updates from prevailing security levels, current time, date, or weather status.

Software services 132 include rules engine service 102, repository service 104, administrator service 106, condition manager service 108, condition status service 110, and structure format service 112.

Rules engine service 102 is for comparing reference input and reference conditions to determine resource access. Repository service 104 is for storing reference conditions to determine access to resources. Repository service 104 may also contain resource manager accounts, customer meta-database referrals and log events. Administrator service 106 is for performing configuration management on repository service 104. Condition status service (CSS) 110 is for comparing reference conditions stored in repository service 104 with the references contained in customer meta-databases. If reference conditions stored in repository service 104 can not be located in any customer meta-database then CSS 110 classifies the reference conditions as deprecated. If the reference conditions belong to an off-line customer meta-database then CSS 110 classifies the reference conditions as unreachable. Deprecated and unreachable reference conditions are flagged in condition manager service 108. Structure format service 112 is for converting all reference inputs into a structured format, such as, distinguished name for LDAP directory services, XML or object oriented structure.

A Resource manager (RM) is assigned the responsibility to establish conditions to access resources. A RM should have a knowledge base that includes: security, customer requirements, resource familiarity and management.

Figure 2:
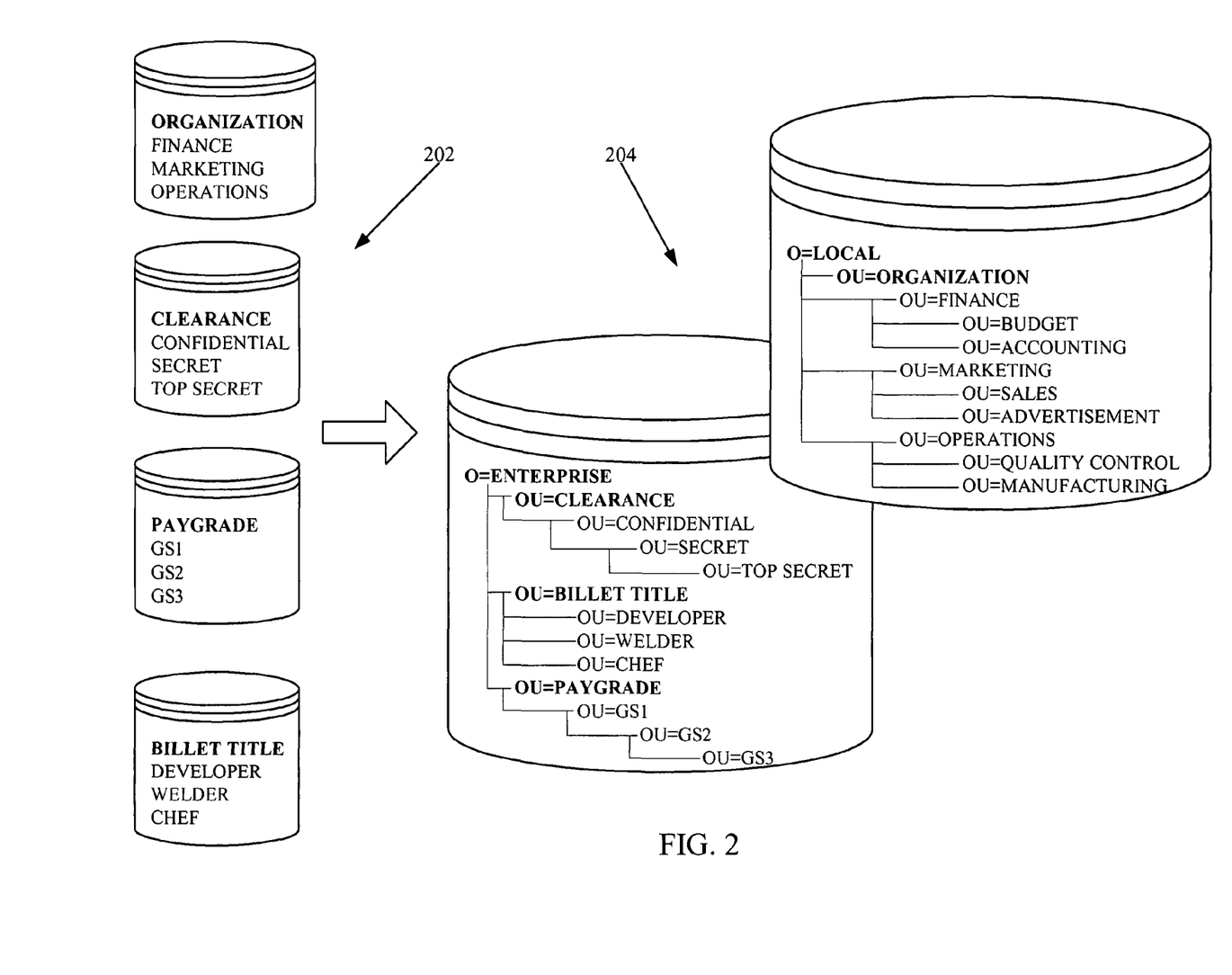

FIG. 2 illustrates customer personnel database 202 and customer meta-database (CMD) 204. Customer meta-database 204 provides RMs a synchronized, centrally managed and reliable data store by which to select conditions to access resources. A customer meta-database can be an LDAP v3 compliant directory service or a relational database. Most organizations store information about employees and the organization in relational databases, identified as customer personnel database 202. The data from customer personnel database 202 is transposed to a structured format and placed in customer meta-database 204. CMDs are owned, maintained and operated by the customer. Although FIG. 2 only illustrates object references, CMD 204 can contain environmental and complex references. Also, customer meta-database 204 illustrates references stored in a directory service in distinguished name (DN) format to illustrate a hierarchical structure, however, it is recognized that the references could be stored in another type of structured format besides a directory service, such as XML or object oriented format.

Figure 3:
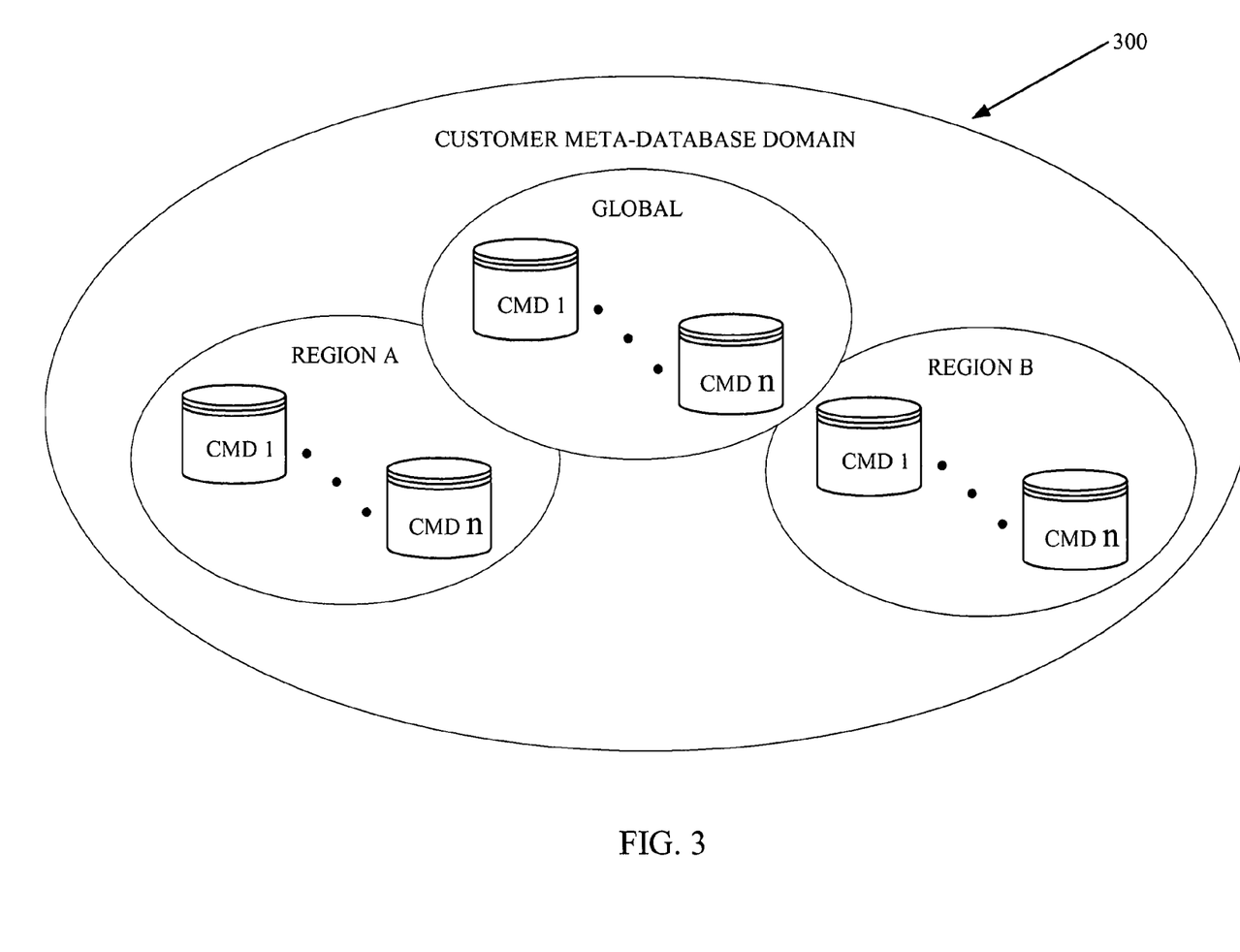

The domain 300, of customer meta-databases, as illustrated in FIG. 3, shows that references can be distributed among many customer meta-databases and managed by various organizations. References can be maintained locally or globally within a community of interest or domain. As shown in FIG. 3, an organization may include regional customer meta-databases at different locations while a headquarters location manages the global customer-meta database. Regional customer meta-databases could reflect local references and could be managed locally. A central customer meta-database could reflect global references and be managed at a headquarters.

Figure 11:
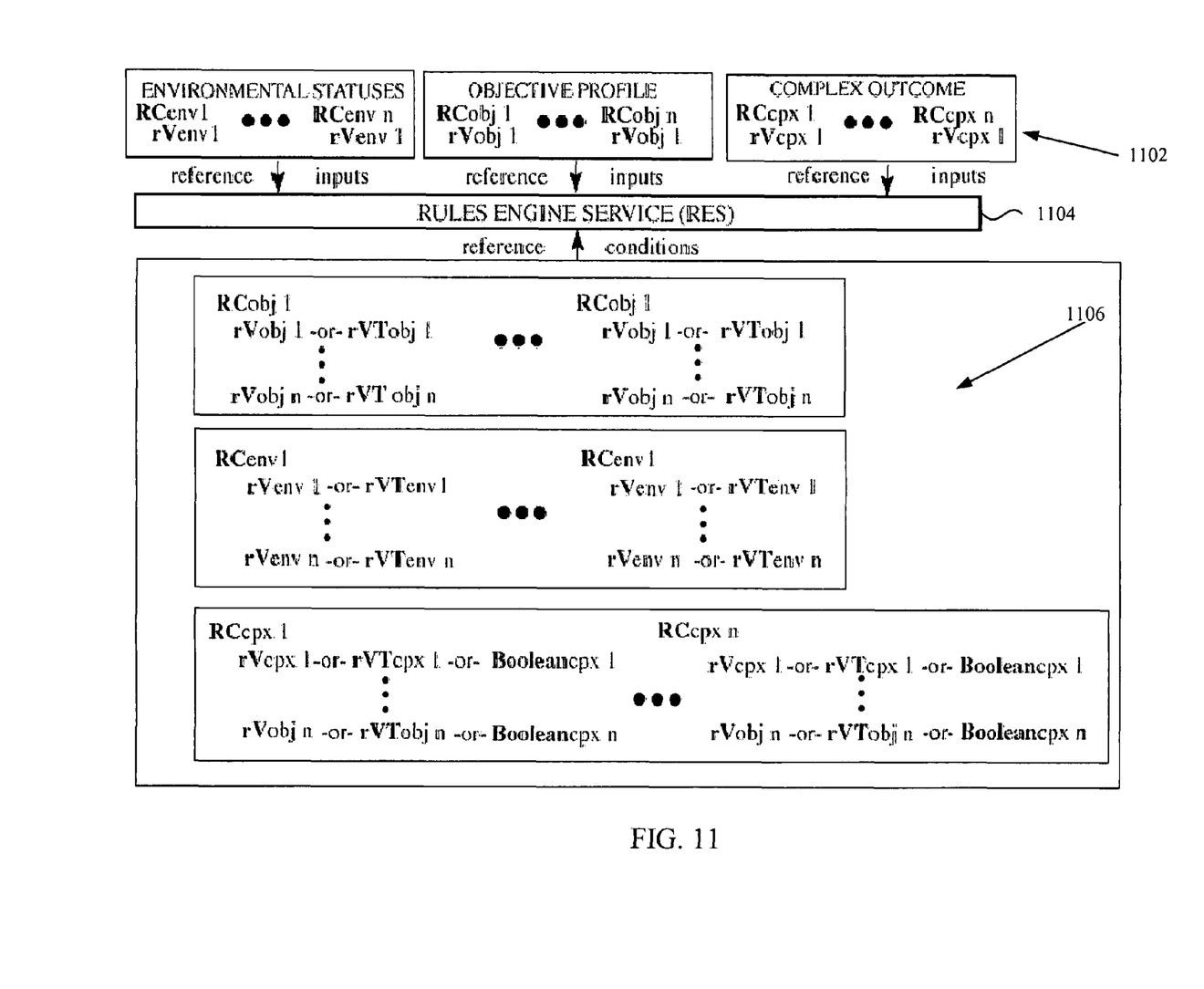

FIG. 11 is a functional block diagram illustrating rules engine service 1104. Rules engine service 1104 is for evaluating reference inputs 1102 and reference conditions 1106. Reference inputs 1102 include environmental statuses, object profiles and complex outcomes. Although FIG. 11 shows Rules engine service as receiving three types of reference inputs, it is recognized that, in addition, a single reference input or combination of any three types of reference inputs may be received by rules engine service 1104.

Reference inputs 1102 may include a plurality of reference values and each reference input 1102 may not include more than one reference value for each reference category. As an example, an object profile may represent the characteristics of a user named "John_Doe". Included under the John_Doe object profile may be several object reference categories. These sample object reference categories may include "Job type", "Clearance", "Organization", and "Paygrade". The object profile may also include a plurality of object reference values, each corresponding to an object reference category. John Doe's object profile may also include object reference values, such as, program manger, secret, accounting, and GS12.

As another example, an environmental status may correspond to security or weather conditions. As an alternative, environmental reference may correspond to the date or time-of-day. Environmental statuses may include a plurality of environmental reference values where each environmental status may not include more than one environmental reference value for each environmental reference category. By way of example, an environmental status may represent security or weather conditions. Included under these conditions are environmental reference categories. These sample environmental reference categories may include "Homeland Security Advisory" and "Temperature". These environmental reference categories may have corresponding environmental reference values of "severe" and "101 hPa".

As yet another example, a complex outcome may include a variable or Boolean value. The complex outcome can be produced by a complex operation that evaluates an object profile and/or environmental statuses.

Still referring to FIG. 11, reference conditions 1106 include conditions necessary for access to a resource. Reference conditions 1106 are contained in a resource profile and can contain any combination of object reference values, object reference value sub-trees, environmental reference values, environmental reference value sub-trees, complex reference values, or complex reference value sub-trees.

Reference conditions 1106 may be structured as a list or as a hierarchical list. Reference conditions may include object reference categories, such as "Job Descriptions" and a plurality of corresponding reference values, such as, Developer, Program Manager, and Chef, etc. These example categories and reference values are for example only and will need to be defined and tailored based on the particular application.

Any particular resource in the system may include one or more resource profiles. By way of example, a resource may include three resource roles: "guest", "user" and "administrator". Each resource role is assigned a corresponding ACR: "guest", "user" and "administrator".

Resource profiles may have two classifications: Allow Resource Profiles (ARP) and Deny Resource Profiles (DRP). An ARP specifically allows an object a resource role access if all reference inputs match all reference conditions within an ARP. A DRP compliments an ARP and serves as a filter by denying an object resource role access if all reference inputs (object profile, environmental status or complex output) matches all the reference conditions in a DRP. A DRP can only exist if one of it's reference values and/or reference value sub-trees is a child of an ARP reference value sub-tree. Each resource profile may include reference values (represented by a checkmark in FIG. 5) or reference value subtrees (represented by a checkmark "T" in FIG. 5). By way of example, a resource may include three ARPs for a guest access control role, one ARP for a "user" access control role, one ARP for an "administrator" access control role, and one DRP for denying access for particular "user" and one DRP for denying access for an "administrator" access control roles. It is recognized that any number of resource profiles may be created for a particular resource depending on access control requirements.

Figure 4:
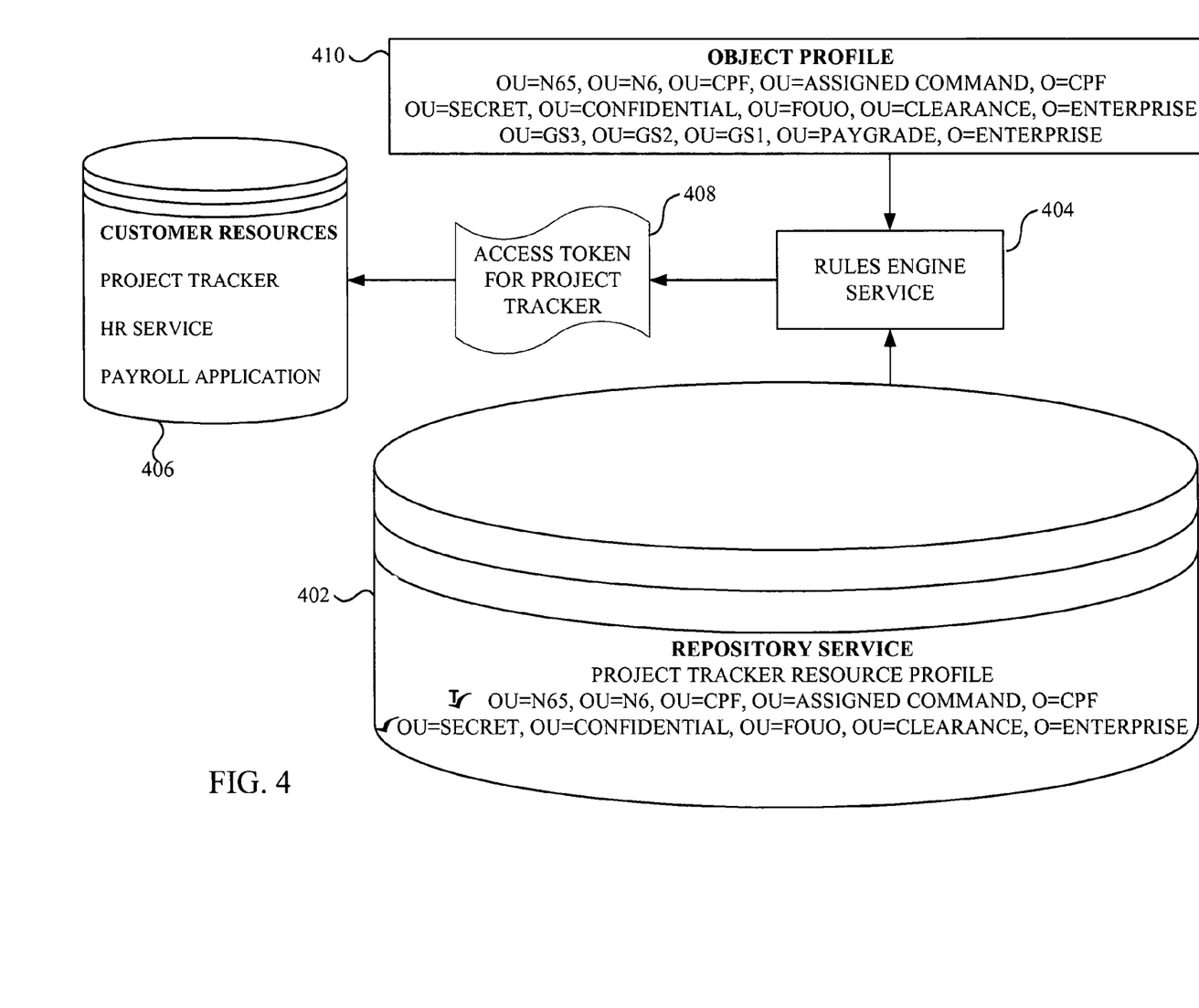

FIG. 4 illustrates an example of an object requesting access to a resource called "Project Tracker" contained in customer resources 400. Rules engine service 404 evaluates an object profile 410 with the Project Tracker resource profile received from repository service 402. For each reference category, within the resource profile, the object profile, environmental status, and complex output must contain a reference value that is included in a reference value or reference value subtree contained in the resource profile. In the example of FIG. 4, the resource profile contained in repository service 402 only contains object reference conditions and no environmental or complex references. Object profile 410 contains at least the minimum necessary reference values, as dictated by the resource profile, for access to the project tracker resource. Rules engine service 404 generates access token 408 for granting the object access to the resource role.

Figure 5:
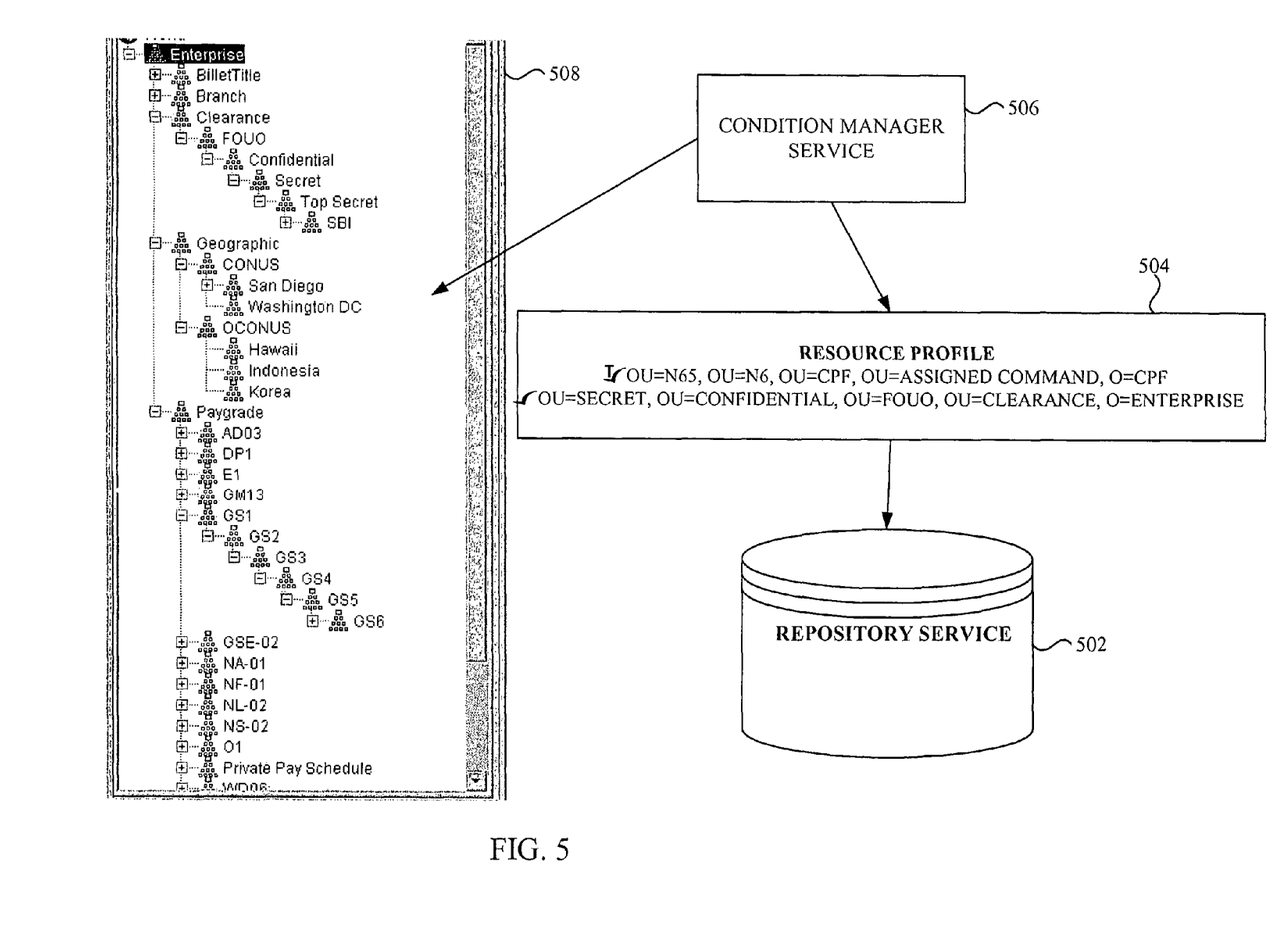
Figure 7:
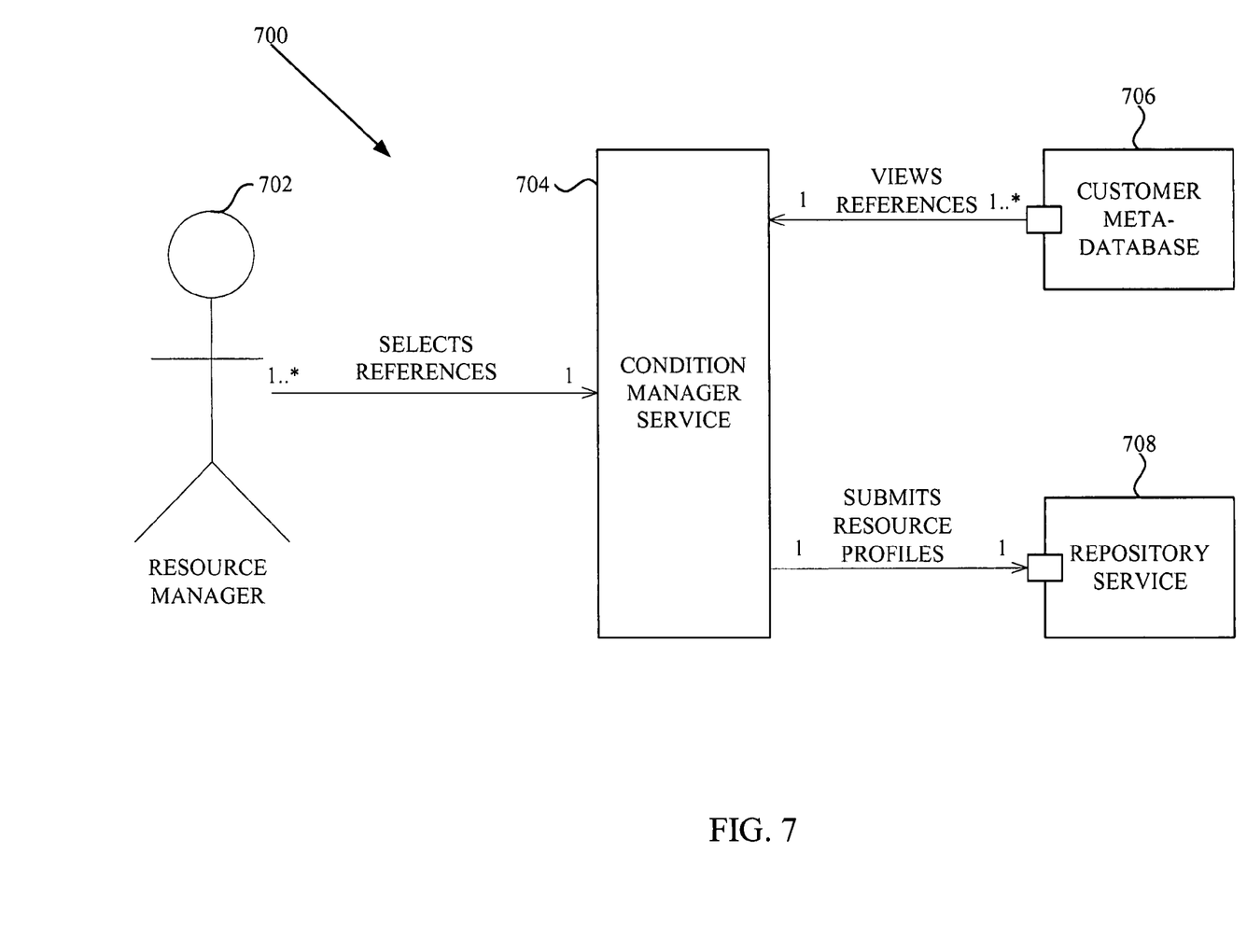

FIG. 7 illustrates a UML diagram 700. Condition manager service 704 allows resource managers (RMs) 702 to view and select reference conditions from various CMDs 706 and submits those resource profile(s) with associated reference conditions to repository service 708. FIG. 5 illustrates an example of a RM (through the use of condition manager service 506) selecting two reference conditions from CMD 508, assigning them to resource profile 504 and submitting them to repository service 502.

Figure 6:
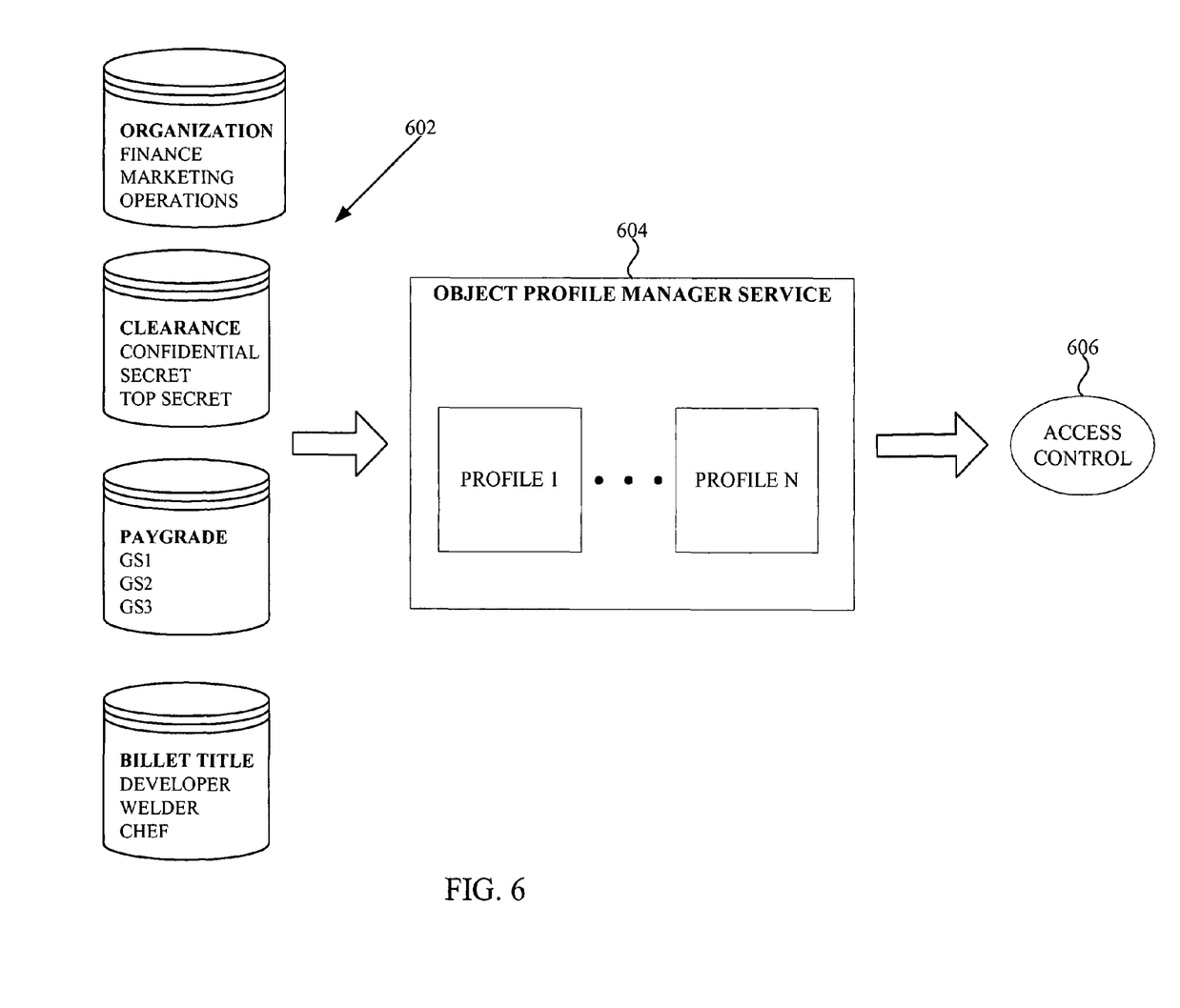

FIG. 6 illustrates a function block diagram of object profile manager service (OPMS) 604. OPMS 604 is a customer furnished and maintained product. OPMS queries customer personnel databases 602 and aggregate object references into one or more object profile(s).

Figure 8:
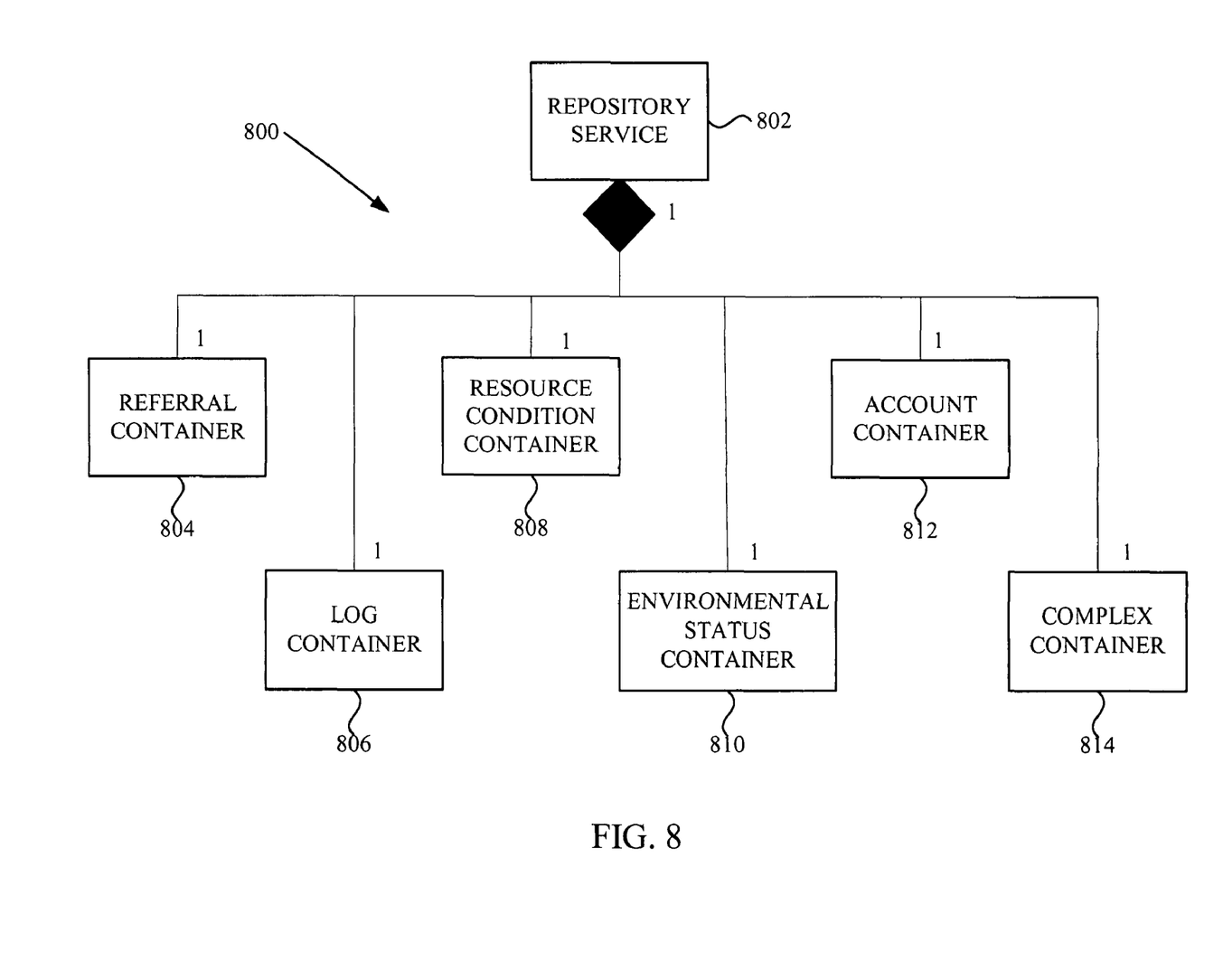

FIG. 8 illustrates repository service 802. Repository service is for storing conditions and configuration management. Depending on the content, data will be stored in one of the following six containers: (1) Referral Container 804 stores parameters to establish connectivity to all domain CMDs; (2) Log Container 806 stores access control events, such as why and when an object was denied resource access; (3) Resource Condition Container 808 stores reference conditions for each resource; (4) Environmental Status Container 810 stores environmental statuses or updates; (5) Account Container 812 stores resource manager credentials for authentication into the Condition Manager Service; and (6) Complex Container 814 stores complex operations to process reference inputs, such as object profiles and/or environmental statuses.

Administrator Service 106, of FIG. 1, performs configuration management functions on repository service. Administrator Service allows administrators to: (1) manage RM accounts; (2) create resource containers for storage of conditions; (3) manage referral parameters to access CMDs; and (4) create data stores of environmental statuses.

Figure 9:
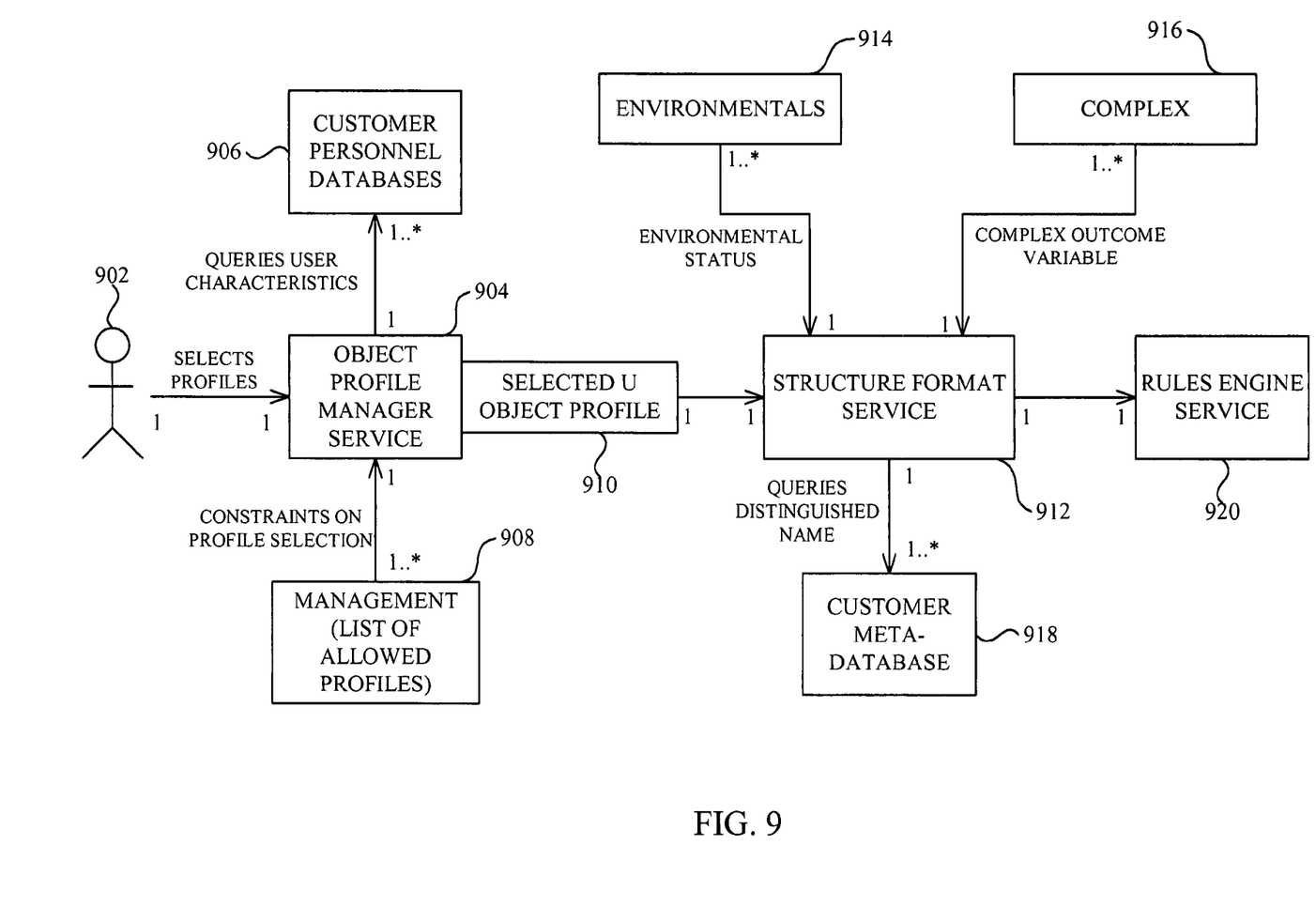

FIG. 9 is an UML diagram illustrating various aspects of the Software Architecture for Access Control Based on Hierarchical Characteristics particularly, structure format service 912. Reference inputs such as object profiles, environmental statuses and complex outcomes may need to be converted into the same structured format as reference conditions in preparation for RES 920 evaluation. For every reference value and associated reference category structure format service 912 performs a search among CMDs 918. If the search produces a match the reference input (910, 914, or 916) is sent to RES 920 for comparison among reference conditions. To evaluate for inheritance reference inputs and reference conditions must be in a structured format. For example, if a reference condition contained the following distinguished name value:

rV: ou=secret, ou=confidential, ou=clearance and an object profile contained the following reference input:

rV: ou=top secret, ou=secret, ou=confidential, ou=clearance then a match would not occur. However, if the reference condition changed to a sub-tree a match would occur because it would represent all values equal or above secret, which includes top secret:

rVT: ou=secret, ou=confidential, ou=clearance

Figure 10:
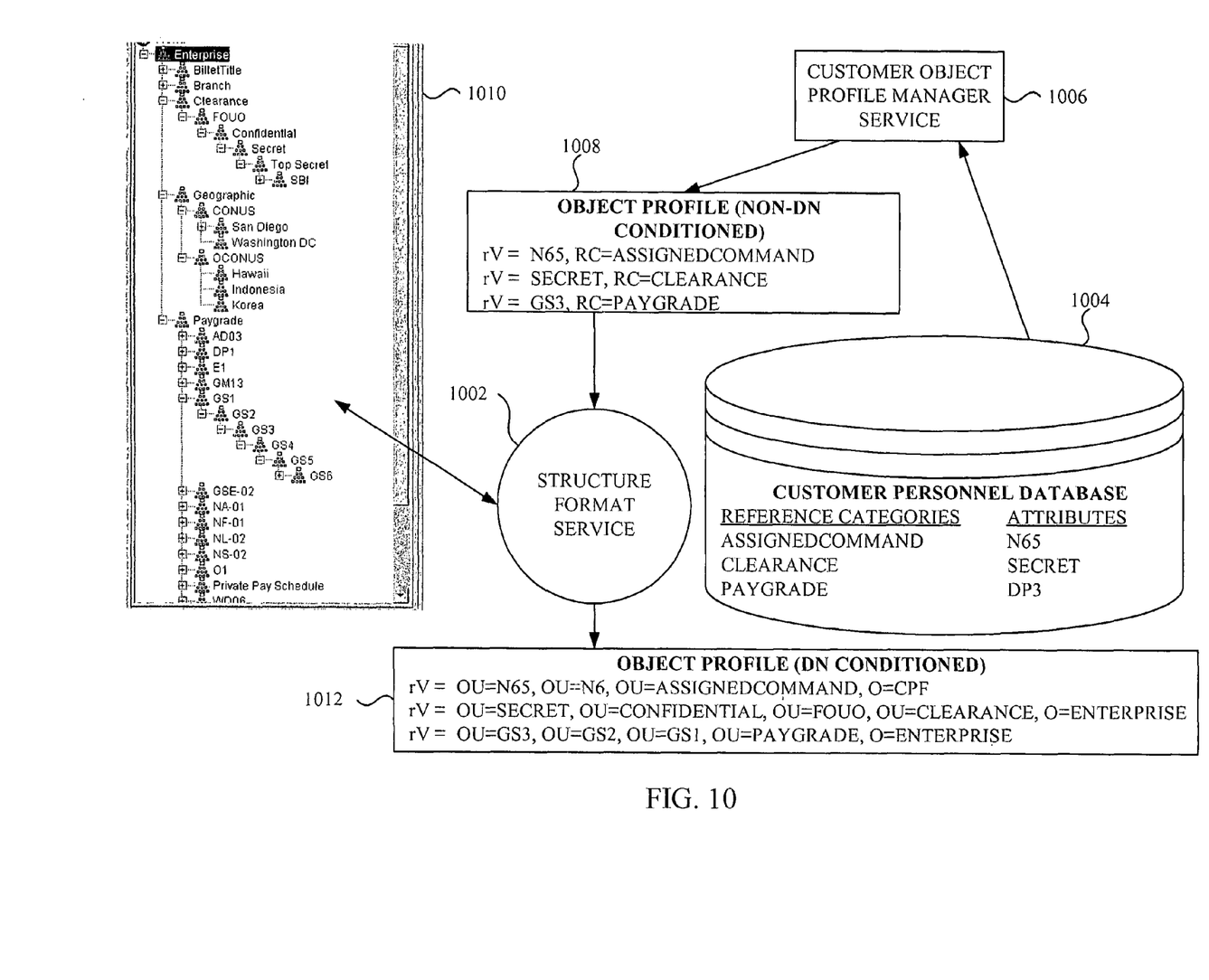

FIG. 10 illustrates an example of object profile 1008 with three reference inputs processed by structure format service 1002 to generate a distinguished name formatted object profile 1012 for submission to a RES.

Reference changes in a CMD due to a re-organization, salary re-structure, etc., could affect resource access because a mismatch may occur between a newly created reference input (such as an object profile, environmental status or complex outcome) and a previously established resource condition in a resource profile. For example, a RM establishes a reference condition from an organization structure contained in a CMD. Assume the selected reference condition requires sales permission to access a particular resource:

ou=sales, ou=operations, ou=ACME

Then a re-organization occurs and the sales department is placed under marketing in the CMD:

ou=sales, ou=marketing, ou=ACME

Now, a user from the sales department will acquire the following reference input in their object profile:

ou=sales, ou=marketing, ou=ACME

Because the reference condition was stored with the old structure (under operations) access will be denied. This automated constraint offers security and ensures RMs reconsider access control policies due to corporate changes. Content changes in CMD 118 could trigger an event in condition status service (CSS) 110 to scan reference conditions in repository service 104. Any mismatches are flagged as deprecated reference conditions in CMS 108. The RM can easily identify the affected conditions and decide to edit or remove the deprecated reference condition(s). CSS 110 can also detect if reference conditions within resource profiles are unreachable. For example, assume a previously selected reference condition:

ou=program manager, ou=job description, o=corporate

If the CMD o=corporate becomes unreachable the structure format service will be unable to add the following reference input to an object profile, even though the object is a program manager:

ou=program manager, ou=job description, o=corporate

The object will be denied resource access because the rules engine service will be unable to find the above reference input in the object profile and match it to the reference condition in the resource profile. CSS 110 will flag these types of conditions as unreachable in CMS 108. Unreachable reference conditions should not be deleted or changed by the RM because CMD 118 may be temporarily off-line.

Therefore Condition status service (CSS) 110 monitors the status of reference conditions. Condition status service 110 automates the location and notification of deprecated (or obsolete) or unreachable resource conditions in condition manager service 108.

Figure 12:
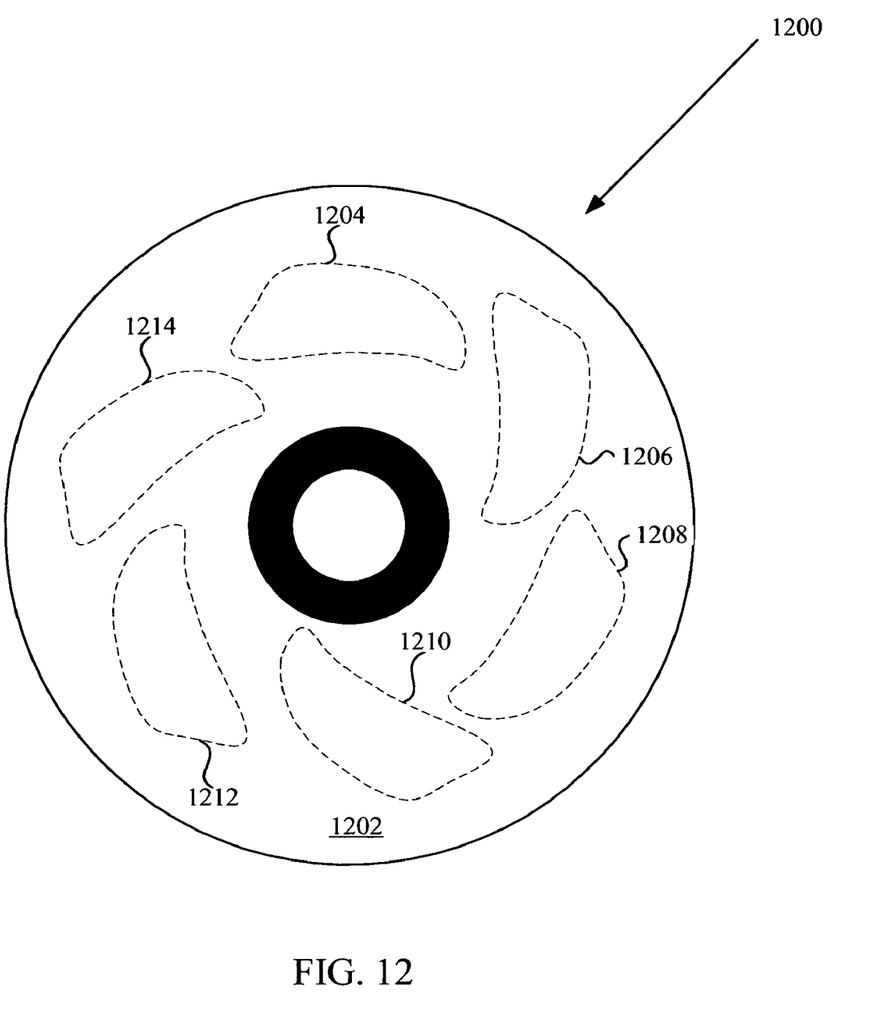
FIG. 12 is a computer program product, in accordance with the Software Architecture for Access Control Based on Hierarchical Characteristics.

FIG. 12 is a diagram of a computer program product 1200, in accordance with the Software Architecture for Access Control Based on Hierarchical Characteristics. Computer program product 1200 includes a recording medium 1202, on which are recorded a plurality of program means consisting mainly of machine-readable binary data representing executable processor instructions making up program means for performing functions and methods according to the features of the Software Architecture for Access Control Based on Hierarchical Characteristics.

CPP 1200 includes first, second, third, fourth, fifth, and sixth instruction means, labeled 1204, 1206, 1208, 1210, 1212, and 1214 respectively. First instruction means 1204 are recorded on recording medium 1002 for directing a computer system to provide a rules engine service, in accordance with the functions and methods of the Software Architecture for Access Control Based on Hierarchical Characteristics. The second instruction means 1206 of CPP 1202 directs the computer system to provide a repository service, in accordance with the functions and methods of the Software Architecture for Access Control Based on Hierarchical Characteristics. The third instruction means 1208 of CPP 1202 directs the computer system to provide an administrator service, in accordance with the functions and methods of the Software Architecture for Access Control Based on Hierarchical Characteristics. The fourth instruction means 1210 of CPP 1202 directs the computer system to provide a condition manager service, in accordance with the functions and methods of the Software Architecture for Access Control Based on Hierarchical Characteristics. The fifth instruction means 1212 of CPP 1202 directs the computer system to provide a condition status service, in accordance with the functions and methods of the Software Architecture for Access Control Based on Hierarchical Characteristics. The sixth instruction means 1214 of CPP 1202 directs the computer system to provide a structure format service, in accordance with the functions and methods of the Software Architecture for Access Control Based on Hierarchical Characteristics.

I claim:

1. A method for controlling object access to a resource, the method comprising the steps of:

using a rules engine service for determining access of an object to a resource by comparing an object profile to a resource profile based on a plurality of object reference categories, wherein each said object reference category includes a plurality of hierarchically linked object reference values, said resource profile represents the minimum said object reference values necessary for access to said resource, and said object profile represents no more than one object reference value for each of said object reference categories; and granting the object access to the resource when the object reference values of the object profile match all of the object reference values necessary for access to the resource.

2. The method of claim 1, further comprising the step of using a repository service for storing a plurality of reference conditions, said repository service interfacing with said rules engine service.

3. The method of claim 2, further comprising the step of using an administrator service for performing configuration management on said repository service, said administrator service interfacing with said repository service.

4. The method of claim 2, further comprising the step of using a condition manager service for establishing said reference conditions in said repository service, said condition manager service interfacing with said repository service and a customer meta-database.

5. The method of claim 2, further comprising the step of using a condition status service for detecting changes between said reference conditions stored in said repository service and data stored in a customer meta-database, said condition status service interfacing with said repository service and said customer meta-database.

6. The method of claim 2, further comprising the step of using a structure format service for converting said object profile into a structured format, said structure format service interfacing with an object profile manager service and a customer meta-database.

7. The method of claim 6, wherein said rules engine service further determines said access by comparing an environmental status to said resource profile based on an environmental reference category, wherein said environmental reference category includes a plurality of hierarchically linked environmental reference values, said resource profile further represents the minimum said environmental reference values necessary to access said resource, and said environmental status represents no more than one environmental reference value for each of said environmental reference categories.

8. The method of claim 7, wherein said environmental reference values are data representing a condition selected from the group consisting of time-of-day, date, security threat level, and weather.

9. The method of claim 7, wherein said distinguished name generator service converts said environmental status into a structured format.

10. The method of claim 1, wherein said object reference values are data representing object characteristics selected from the group consisting of security clearance, paygrade, job function, job title, employer, and organizational group.

11. The method of claim 1, wherein said rules engine service further determines said access by comparing an environmental status to said resource profile based on an environmental reference category, wherein said environmental reference category includes a plurality of hierarchically linked environmental reference values; said resource profile further represents the minimum said environmental reference values necessary to access said resource; and said environmental status represents one of said environmental reference values.

12. The method of claim 11, wherein said environmental reference values are data representing a condition selected from the group consisting of time-of-day, date, security threat level, and weather.

13. A method for controlling object access to a resource, the method comprising the step of:
 using a rules engine service for determining access of an object to a resource by comparing an environmental status to a resource profile based on a plurality of environmental reference categories, wherein each said environmental reference category includes a plurality of hierarchically linked environmental reference values, said resource profile represents the minimum said environmental reference values necessary for access to said resource, and said environmental status represents no more than one environmental reference value for each of said environmental reference categories; and
 granting the object access to the resource when the object reference values of the object profile match all of the object reference values necessary for access to the resource.

14. A computer program product for use with a computer system, said computer program product comprising:
 a non-transitory machine-readable recording medium;
 a first instruction means, recorded on said recording medium, for directing said computer system to provide a rules engine service for determining object access of a resource by comparing an object profile to a resource profile based on a plurality of object reference categories, wherein each said object reference category includes a plurality of hierarchically linked object reference values said resource profile represents the minimum said object reference values necessary for access to said resource and said object profile represents no more than one object reference value for each of said object reference categories.

15. The computer program product as in claim 14, further comprising:
 a second instruction means, recorded on said recording medium, for directing said computer system to provide a repository service for storing a plurality of reference conditions, said repository service interfacing with said rules engine service.

16. The computer program product as in claim 15, further comprising:
 a third instruction means, recorded on said recording medium, for directing said computer system to provide an administrator service for performing configuration management on said repository service, said administrator service interfacing with said repository service.

17. The computer program product as in claim 15, further comprising:
 a fourth instruction means, recorded on said recording medium, for directing said computer system to provide a condition manager service for establishing said reference conditions in said repository service, said condition manager service interfacing with said repository service and a customer meta-database.

18. The computer program product as in claim 15, further comprising:
 a fifth instruction means, recorded on said recording medium, for directing said computer system to provide a condition status service for detecting changes between said reference conditions stored in said repository service and data stored in a customer meta-database, said condition status service interfacing with said repository service and said customer meta-database.

19. The computer program product as in claim 15, further comprising:
 a sixth instruction means, recorded on said recording medium, for directing said computer system to provide a structure format service for converting said object profile into a structured format, said structure format service interfacing with an object profile manager service and a customer meta-database.

20. The computer program product as in claim 14, wherein said rules engine service further determines said access by comparing an environmental status to said resource profile based on an environmental reference category, wherein:
 i. said environmental reference category includes a plurality of hierarchically linked environmental reference values;
 ii. said resource profile further represents the minimum said environmental reference value necessary to access said resource; and
 iii. said environmental status represents no more than one environmental reference value for each of said environmental reference categories.

21. The computer program product as in claim 14, wherein said object reference values are data representing object characteristics selected from the group consisting of security clearance, paygrade, job function, job title, employer, and organizational group.

* * * * *